May 21, 1929.                B. G. H. VAN DER JAGT                1,713,681
PROCESS, PLANT, AND APPARATUS FOR THE INDUSTRIAL TREATMENT OF COCONUTS
         AND THEIR CONSTITUENTS, PARTICULARLY COCONUT FIBERS
                 Filed Jan. 29, 1926         7 Sheets-Sheet 6
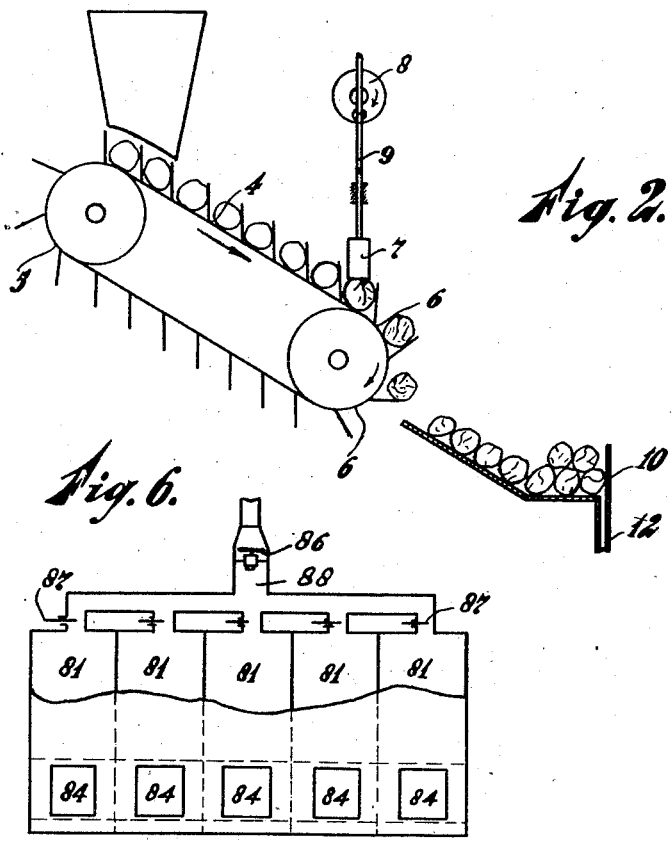
Fig. 2.
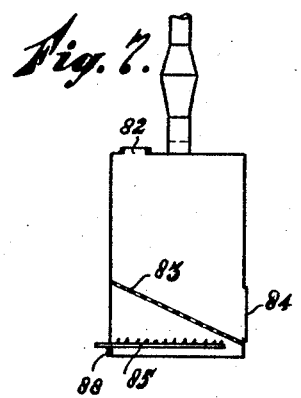
Fig. 6.
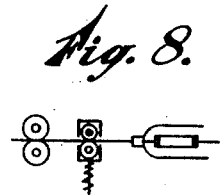
Fig. 7.
Fig. 8.
B. G. H. Van Der Jagt
INVENTOR
By: Marks & Clerk
Attys.

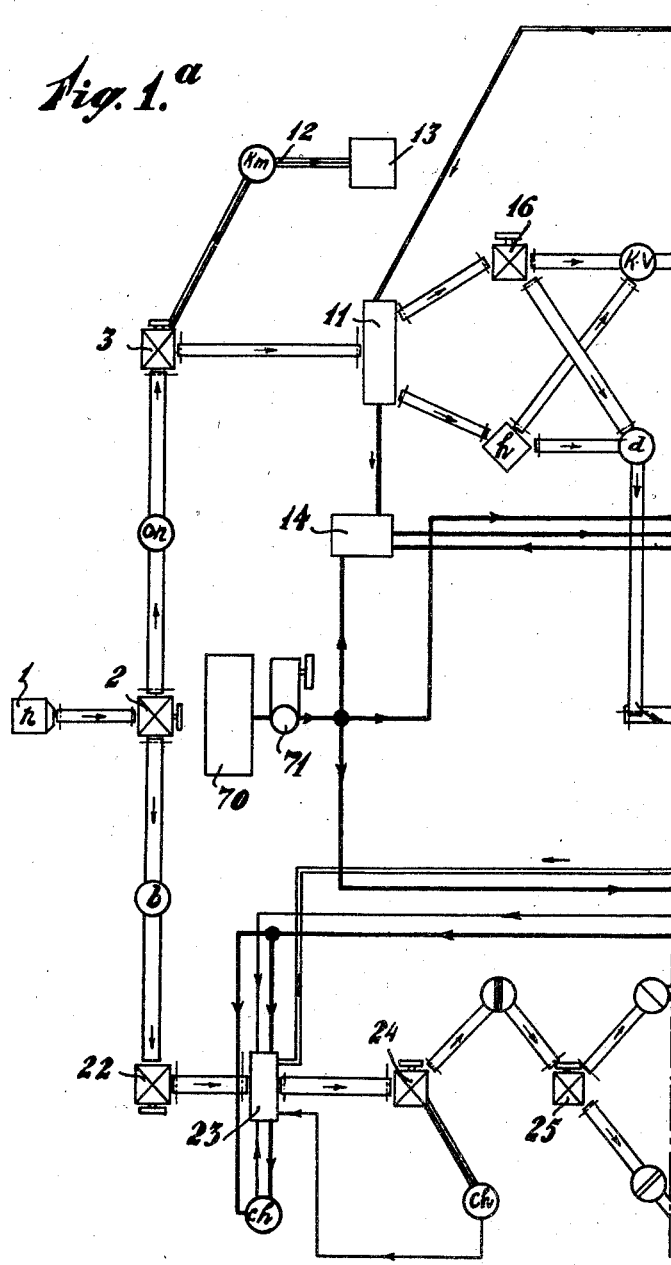

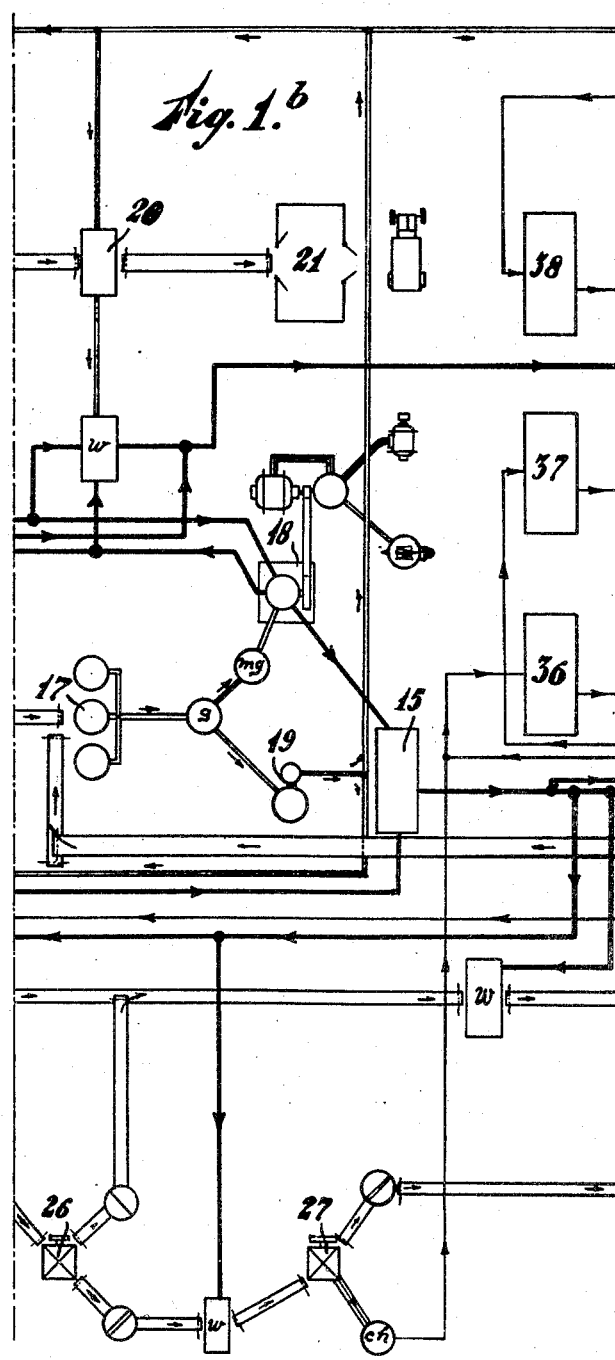

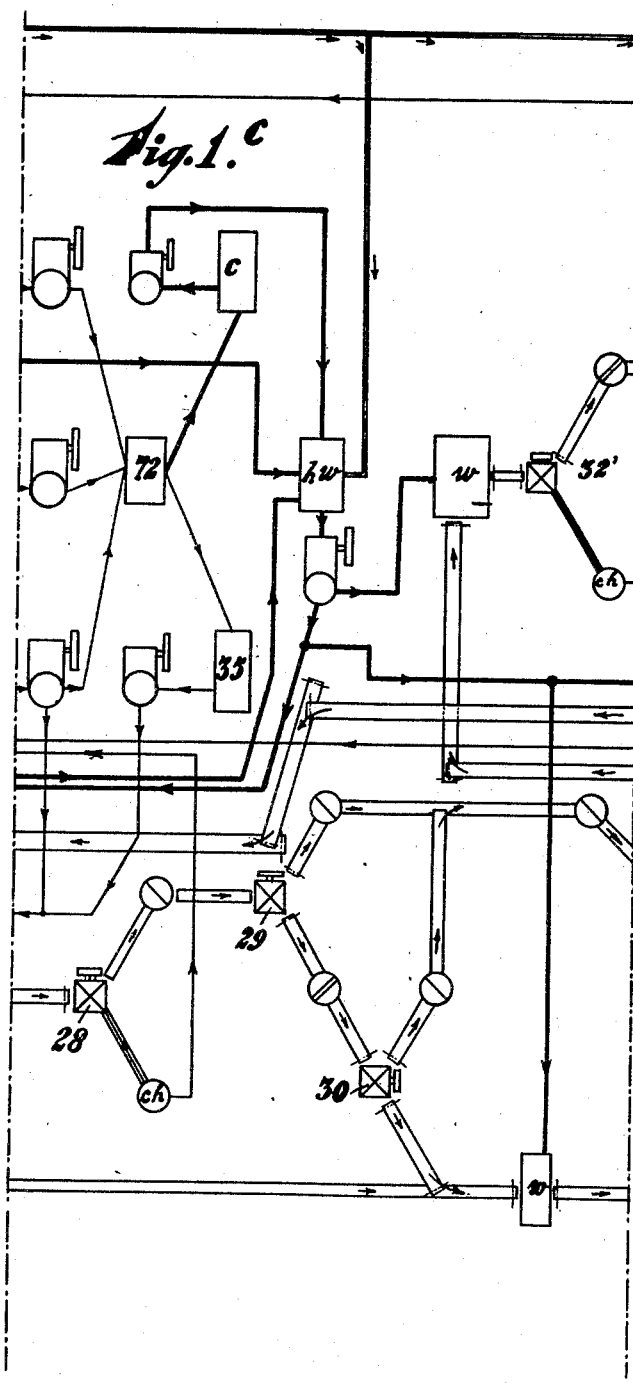

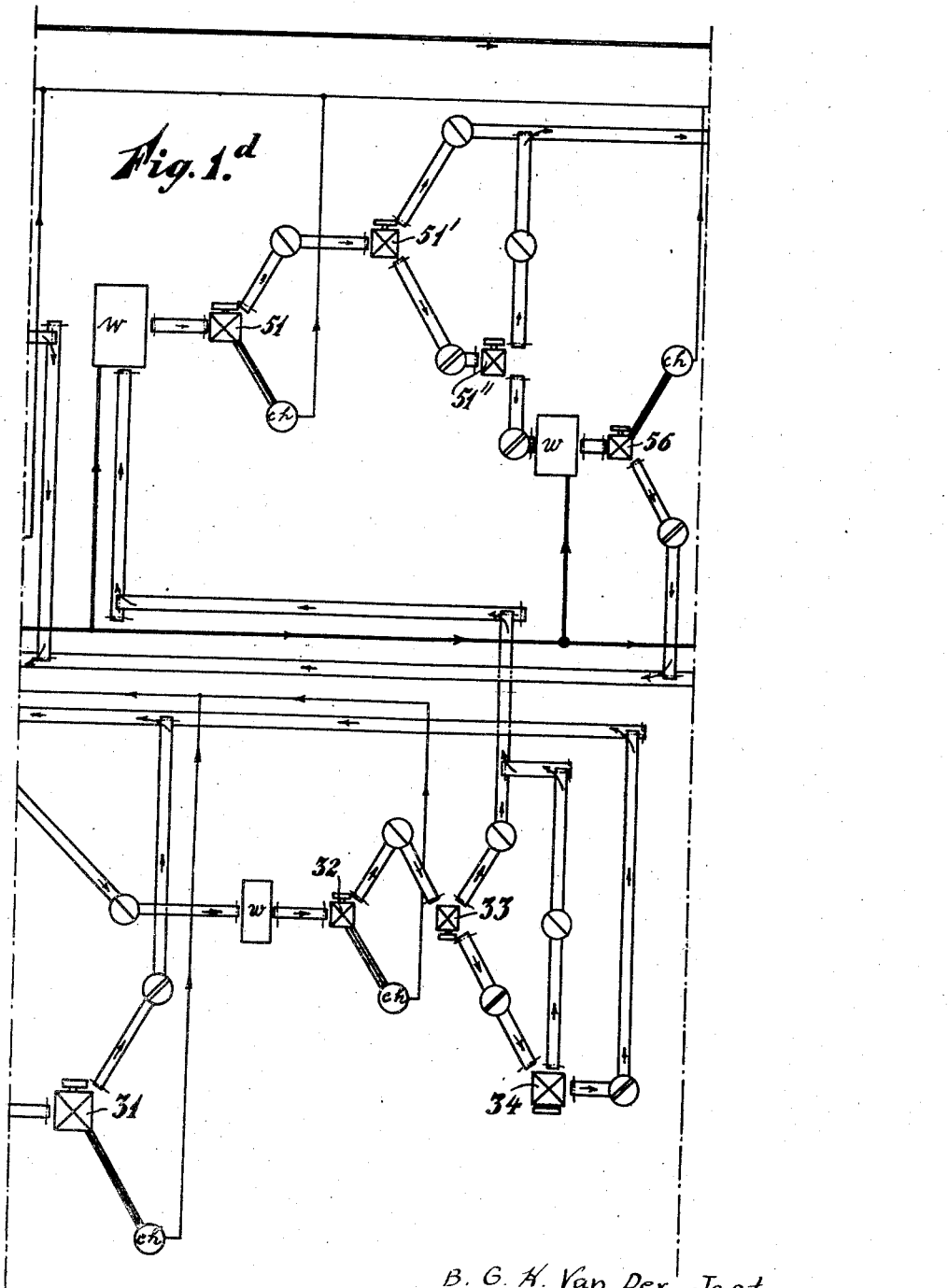

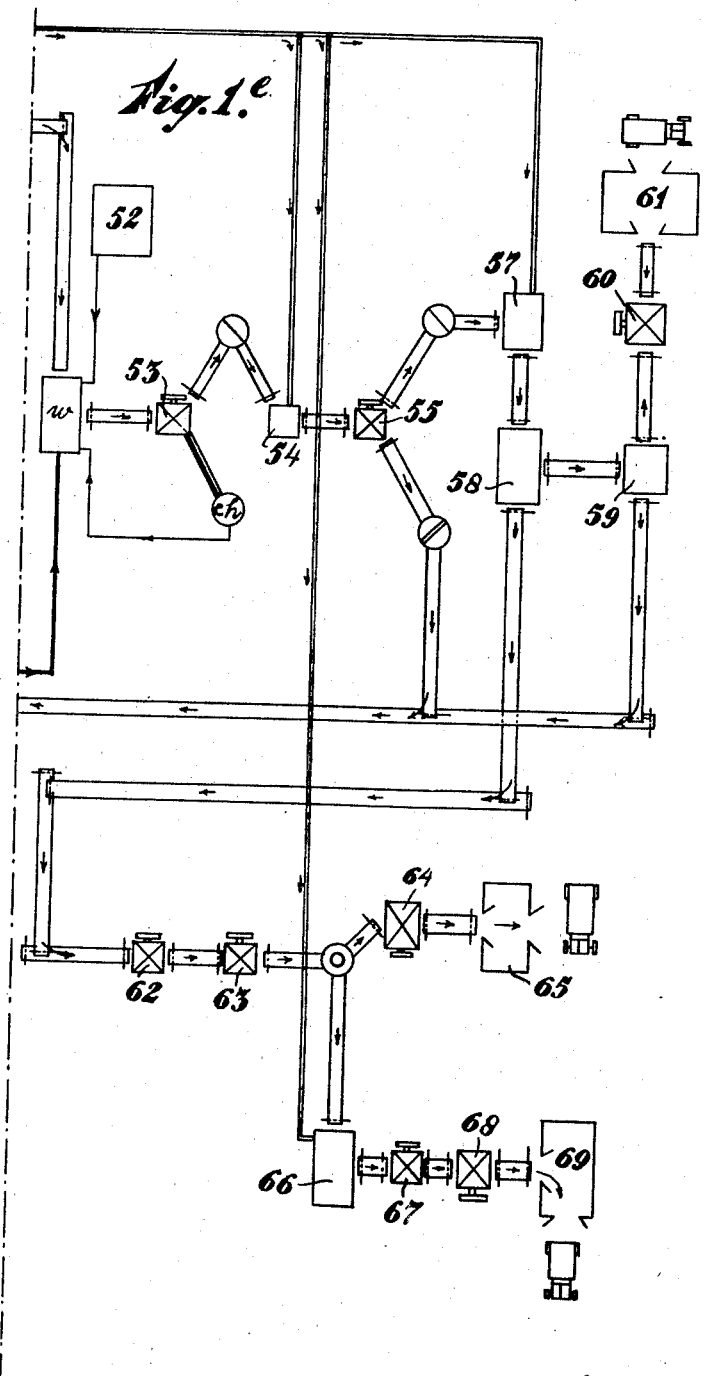

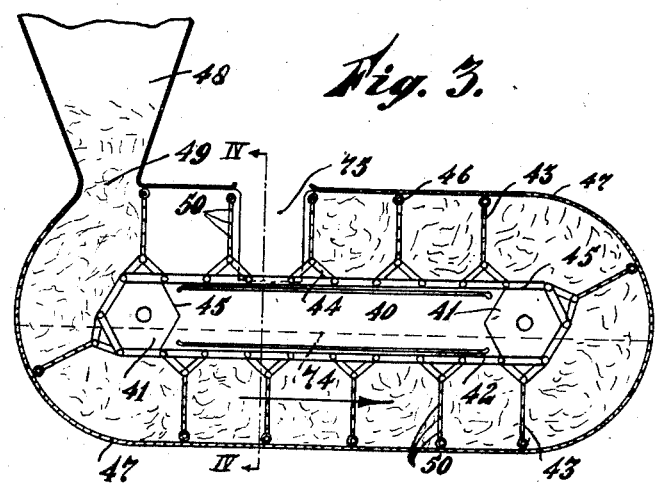
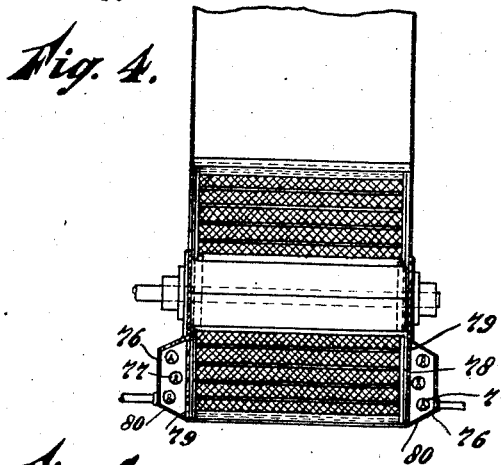
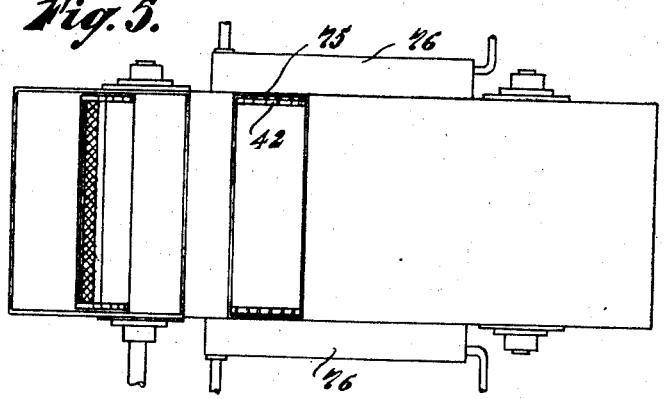

Patented May 21, 1929.

1,713,681

UNITED STATES PATENT OFFICE.

BAREND GYSBERTUS HENDRIKUS VAN DER JAGT, OF THE HAGUE, NETHERLANDS, ASSIGNOR OF ONE-THIRD TO DR. ZADOK VAN DER BERGH, OF AMSTERDAM, NETHERLANDS, AND ONE-THIRD TO FREDERICK ADRIANUS JOHANNES VAN KUYK, OF BUSSUM, NETHERLANDS.

PROCESS, PLANT, AND APPARATUS FOR THE INDUSTRIAL TREATMENT OF COCONUTS AND THEIR CONSTITUENTS, PARTICULARLY COCONUT FIBERS.

Application filed January 29, 1926, Serial No. 84,743, and in the Netherlands February 2, 1925.

This invention relates to a process for the industrial treatment of coconuts and their constituents particularly coconut fibers, and also to a plant and apparatus embodying the process.

Hitherto it has been generally considered that a fiber of good quality could only be obtained from unripe coconuts, whereas in order to obtain copra of the proper quality fully ripened coconuts are necessary. Hence the custom has been to allow the maturing of the nuts so as to obtain good copra (as the more valuble product) and sacrifice the quality of the fiber. This has resulted in the production of the inferior fiber generally known as coir that has been made up into coarse ropes and mats but which is not suitable for being spun completely by mechanical means.

One object of the present invention is the production of a spinnable fiber from the matted mass of fiber and pith which forms the husk of the coconut.

Another object of the invention is to obtain from one and the same nut ripe fruit flesh and spinnable fiber, that may be woven into fabrics.

A further object of the invention is an installation or plant by which coconuts are treated in bulk by interlinked apparatus so that in addition to copra and spinnable fiber being obtained, all of the constituents of the coconuts may be utilized, the whole of the operations being carried out with full regard to economy and speed.

The invention principally consists in a process for obtaining spinnable fiber from coconut husks preferably containing ripe fruit flesh, consisting in separating the husk from the shell, crushing the husk to facilitate the access of liquid into the matted mass of fiber, saturating the husk with a liquid lubricant medium preferably a boiling weak alkali or other lye, adapted to allow the fibers to slip easily over one another, pressing the saturated husk to remove the surplus lye, subjecting the husk to one or more operations whereby the saturated husk is disintegrated as by teasing with spiked rolls and alternately pressed between rollers, and differentially drying the fiber and pith to enable the complete removal of the latter, leaving the fiber separated and clean and in a condition suitable for spinning.

As is well known, the coconut has the following composition; the inner space of the nut is filled with the so-called coconut-milk; the globular nut, consisting of coconut-flesh (copra), is successively surrounded; (a) by a pellicle, (b) by the very hard shell and (c) by the husk, constituted of coconut-fibers and the pith (cofferdam), said husk being surrounded at the outside by a hard skin or epidermis.

By the expression "pith" is meant the corky mass in which the coconut-fibers are embedded.

Entirely in contradistinction with the prevailing opinion, it has appeared from extensive experiments undertaken by the present applicant that in applying the process according to the invention, it is possible to obtain from the husks of coconuts very fine fibers which are perfectly suitable for mechanical spinning purposes, even to such an extent, that a new or improved fiber may be said to have been obtained. The fiber obtained according to the invention is so supple and elastic that it may not only be spun and woven wholly mechanically, but moreover it is also suitable for the manufacture of a great number of products, such as packing material, as e. g. sugarbags, yarns for various purposes, fine cords, even for fish nets and other purposes for which such fibers are suitable.

The process and the apparatus for carrying the same into effect will now be explained and illustrated with reference to the accompanying diagrammatic drawings, but it should be observed, however, that the invention is by no means limited to these examples.

In these drawings:

Fig. 1 (a, b, c, d, e) is a diagrammatic view of the "layout" of the apparatus by which the coconuts are treated according to the invention, Fig. 2 is a sectional elevation of an apparatus for packing coconuts;

Figs. 3, 4 and 5 are respectively a sectional elevation, a cross section and a plan view of a cooking or soaking apparatus for the husks;

Figs. 6 and 7 show respectively a side elevation, and a cross-section of a drying apparatus for the copra.

Fig. 8 is a diagrammatic side view of a pair of press rollers, which may be combined with any ordinary spinning machine, here, however, only serving the purpose to press the cylindrical cocoscoir into a flat ribbon for spinning from the same material thinner and much stronger threads than it has been possible hitherto.

As indicated in Fig. 1 of the drawings, the nuts $n$, coming from the coconutpalm, are carried from the store-house, which is not shown in the drawings, at the place marked 1, e. g. by means of endless belts to the husking machine 2. The nuts $n$, deprived from their husks $b$, are fed mechanically to the cracking or breaking machine 3, the latter having for its purpose to strike the nut with such a blow that the hard shell and the fruit-flesh are broken, thus allowing the coconut milk to flow out.

As appears from Fig. 2, the cracking or breaking machine may consist of an endless belt 4, running over two rotating drums 5 and 6, on which belt the nuts are successively fed under a drop-hammer 7, to which, by means of a crank disc 8 and a rod 9, an up and downward movement is communicated. It is necessary that the hammer should always drop at the moment when a new nut is placed underneath. By the continuous movement of the endless belt 4, the cracked nuts are rolled into the gutter 10 and subsequently onto a conveying belt, carrying them to the primary drying chambers 11 (Fig. 1a). The gutter 10 is provided with an outlet pipe 12 conducting the coconut-milk $k$. $m$. flowing out of the cracked nuts to the receptacle 13 (Fig. 1a) for any desired further treatment.

Figs. 6 and 7 show a diagrammatic view of the drying chambers for the primary drying and the secondary drying to be mentioned hereinafter, which are constructed in such a way that they are entirely adapted to the process according to the invention and have special advantages over the existing constructions.

The primary drying chamber consists in the example as illustrated of five separate compartments 81. It is of course possible to apply more or less compartments, however, as the preliminary drying lasts about four hours, it is possible, by continuously using each of the five compartments during one hour, to load one of them, whilst in the other compartments drying takes place.

The drying chambers are preferably constructed with the aid of iron framework with brick or concrete walls. At the top, the opening 82 is provided for loading the drying chambers. The nuts or the fruit-flesh fall down onto a sufficiently inclining perforated plate 83. At the lower end of this plate a swinging or sliding door 84 is arranged; as soon as the latter is opened the charge falls down by its weight onto a platform (not illustrated), provided in front of said primary driers. The inclining plate has the advantage that no extra manual labour is required for discharging the drying chambers, as is the case with other copra drying plants.

Under the perforated plate open gas burners 85 are arranged, heating the air to the desired temperature. The heated air chooses its way through the perforated plate and into the chamber, where the material to be dried is disposed. The vapour is sucked off by an exhauster 86, above the drying chambers. For all drying compartments one and the same exhauster may be used.

In the conduits or tubes leading from the drying chambers to the exhausters, slides 87 may be arranged for regulating and shutting the outlet openings. At the lower side of the drying chambers, openings 88, which may be regulated and shut-off, are also arranged for regulating the supply of fresh air. The gas burners are provided with stop valves and adjusting devices, so that it is impossible for an accumulation of unconsumed gas to take place, which might cause explosions. Further a telltale device may be arranged indicating when the desired temperature is exceeded or when it reaches a certain minimum. In consequence of this arrangement of the drying chambers and of the drying kiln, a minimum of manual labour, and a maximum of capacity and economy are attained and continuous working is guaranteed, in contradistinction to the existing drying kilns for copra, which are heated with open fires. The hot air discharged from the drying chambers, first passes to a water-heater 14, connected with the hot water apparatus 15, so that as many callories as possible are utilized. This water-heater is indicated diagrammatically in the figure.

The heated air, instead of passing through the water-heaters, may be used over again for the drying of the copra, by means of pipes and valves, connecting the exhaust of the fan to the air inlet of the dry-kiln.

After about four hours of drying at the desired temperature, the fruit-flesh is dried and shrunk to such an extent, that it is loose from the hard shell and may therefore be easily separated therefrom. As soon as the desired degree of dryness is attained, the door is opened and the nuts pass into the room 16, where the shells are separated from the fruit-flesh by hand or mechanically. The husks $d$ are then transported to the gas generators 17, which are connected with a suction gas motor 18 for supplying the motor gas *m. g.*, which motor drives the dynamos or the driving shaft for a power and light plant. Part of the gas *g* prepared in the gas generators 17, may be discharged through tubes indicated in the drawing by a double line, to the gas purifiers 19, supplying the gas for the drying chambers, the cooking and other apparatus and for other purposes relative to the plan. The fruitflesh *k. v.* deprived of its shells 16 is conveyed to the secondary drying chambers 20, which are constructed entirely similar to the primary drying chambers 11, except in that they are provided with preferably 12 compartments, arranged in two batteries of six compartments, opposite to each other. The fruitflesh is dried in these chambers at the desired temperature until the required degree of dryness for the trade is attained, after which it is transported away as copra.

The coconut-husks, separated in the husking machines 2 from the nuts, are conveyed to the crushing machines 22. The latter may e. g. consist of two or more rollers arranged above or adjacent to each other, revolving in opposite directions and provided with pins or spikes, having for its purpose to loosen the husks, so that the lye may be easily absorbed. In an untreated husk the liquid penetrates much more slowly than in one that has been treated. The crushing machines for the husks may also be directly arranged next to the husking machines 2 and driven by the same mechanism, so that they form a unit; they may, however, operate separately from each other.

When the husks leave the crushing machines, they are conveyed on conveying belts to the receptacles, above the cooking apparatus 23. From these receptacles or silos the cooking apparatus 23 may then be charged. In these cooking apparatus the husks are subjected to the effect of a lye.

For preparing this lye several kinds of chemicals may be used; they must, however, be of such a nature, that, when dissolved in water they produce a greasy or lubricating substance, such as is the case f. i. with caustic and other soda solutions and soap.

The great advantage of the construction of the cooking apparatus 23, according to Figs. 3, 4 and 5 consists in this, that it is particularly well fitted for treating coconut-husks. In coming from the crushing machines in a dry state the husks are very voluminous and incompressible. This condition changes, however when the husks have absorbed a certain quantity of lye, which is effected very rapidly by the great absorbing capacity of the crushed husks. The same quantity of husks then requires much smaller space. The principle of the cooking apparatus, as constructed according to the invention, is altogether in agreement with this requirement. The husks are brought into the apparatus through a hopper 48. Over two rotating polygonal drums 41 passes a double endless chain 42, on which chain a number of narrow boards or the like are provided. On these boards are socles 44 provided, the breadth of which practically corresponds with the breadth of the peripheral partitions 45 forming the polygonal drums 41. The whole is arranged in such a way that during the circulation of the double endless chain in the container, the upper sides of the boards 43 run on the same distance, being as small as possible, from the lower, upper, and half cylindrical sidewalls 47 of the container. The upper and lower sides of the boards 43 are provided with rollers 46 so as to decrease as much as possible the friction on the running surfaces. As stated above, the husks are introduced through the hopper 48, which is provided with a slide. The husks then fall down in the larger chamber under 49 and partly into the lye, with which the apparatus is filled, to the dotted line 74. That level is still below the shafts, supporting the polygonal drums 41, so that leakage alongside the bearings is not to be feared, thus allowing a simple consturction of the apparatus. By the downward movement of the chains the husks are gradually plunged into the lye and in the smaller space between two vertical boards 43. The boards are connected with rods, against which large-sized metal gauze may be provided, so that the husks cannot fall from one compartment into the other. The velocity of the chain is now regulated according to the desired cooking period of the husks (about 1½ to 2 hours) and takes place in the direction as indicated by the arrow. The husks having a great floating capacity, the boards keep them under the surface of the lye. In the upward movement of the boards, the husks are transported above the liquid level. In this way the husks may leak out for a considerable time, whereby as much lye as possible is recovered. When the husks have arrived in the last compartment but one in front of the filling hopper 48, where in one of the side-walls an opening 75 is provided, they can be taken out of the compartment and may be conveyed on a conveying belt to a fiber-purifying plant.

The cross section in Fig. 4 shows at either side of the cooking apparatus a vertical trapezoidal projection 76, in which pipes 77 are indicated. In these pipes gas burners or other heating devices are provided, by which the lye is heated. In the vertical partitions 78, separating the heating rooms from the container through which the husks are being moved, preferably longitudinal openings 79 are arranged at the upper and lower side. The lye having accomplished its action on the husks, arrives in the lowermost part of the cooking apparatus. By the heating pipes the lye in the heating rooms is kept on boiling temperature and by its foaming it will escape through the upper and flow in through the lower openings 79. In this way a thorough and continuous circulation of the lye is obtained. By the inclining surfaces 80 at the lower side of the heating rooms, the precipitation and accumulation of sediment is prevented and a more intense spreading of the lye over the husks at the upper side is assured. The advantages of the cooking-device are thus: a great capacity, a regular and automatic working (as the driving gear of the polygonal drums may be driven mechanically), as much direct recovery of the lye as possible by the drainage of the husks, a very small evaporation, owing to the closed construction of the container and an easy way of emptying of each compartment through the opening 75. By insulating the heating rooms, loss of heat by radiation is minimized.

As during the application of the cooking process a certain portion of the chemicals dissolved in the lye is lost, it is necessary that the concentration of the lye be kept constant, so that it does not lose its lubricating properties. This may be effected by returning the recovered lye to the cooking apparatus and by regularly adding thereto the required fresh lye. The supply of the lye takes place preferably at different points at the lower side of the heating rooms 76, so that a thorough mixing with the lye already present in the container and an effective heating is attained.

In connection with the use and the recovery of chemicals dissolved in the lye, it be observed, that practical experiments have proved that the quality of the fiber is not depending on the quantity of the chemicals, with which the process is commenced. It seems that through the treatment of the husks by boiling them for some time, some agent or other is extracted from the husks, which agent promotes the loosening and the preparation of the fibers. This part of the invention consists therefore in the feature that the same liquid may be applied several times for treating fresh material, without regeneration, in fact no regeneration at all of the lye need take place, during the whole process. Thus it would be quite possible to start the process with no chemicals whatever, in which case, after a certain time the process can be carried out by means of the agent, extracted out of the husk. As, however, in this case most of the fiber treated in the beginning of the process would be lost, in practice such a course would not be taken, but some chemicals having directly the same effect as this agent, may be used instead, as e. g. caustic soda, soap and chiefly alkaline chemicals, which materials have the required lubricating properties, when solved in water.

The extraordinary advantages obtained by this feature of the invention need no further elucidation. As a matter of fact the cost of the chemicals required for loosening and preparing the fibers are an all important matter, whereas the invention reduces these costs to such extent that they now form only a subordinate part. The fact that in treating coconut husks it was hitherto considered necessary to use a lye of caustic soda, of a concentration even up to 40%, illustrates sufficiently the importance of the saving now obtained.

After the husks having been cooked for some time (e. g. during two hours) in the cooking apparatus 23, they are conveyed to the fiber-purifying-plant, where they are first subjected to the treatment of pressing machines 24. (Fig. 1a.) These machines have for their purpose to recover in the first place, the large quantity of lye still contained in the husks. This lye, being still fairly hot, is immediately returned to the cooking apparatus 23. The treatment in the pressing machines has further for its purpose to loosen as much as possible the pith or corky mass from the fibers. This is particularly necessary for the following reasons. At the lower end of the husk, opposite the place where the fruit was attached to the bunch, the pith or corky mass is transformed into a ligneous mass. Though this mass, by the treatment in the crushing machines 22 is already loosened considerably, a great portion of the ligneous mass is still present. Owing to the subsequent cooking this remaining portion is somewhat softened and in now pressing the husk, the pith or corky mass will be loosened altogether. This is very essential not only as the longest fibers extend into that ligneous part, but also for the following reasons; the pith or corky mass, which encloses all the fibers like a cylindrical cover, becomes very soft by boiling the husk for some time; by subsequently pressing this cylindrical cover, it becomes flat so that after loosening the husks by means of combs and brushes, the pith will come off in small pieces from the fiber and can thus be easily removed.

The pressing-machines may be provided with grooved rollers revolving in opposite directions. The pressure on these rollers may be adjusted by means of springs. The grooves or the like are required to ensure a good grip on the husks, preventing, however, the fibers being injured. The pressing may be effected in various other ways, but the purpose of the treatment will ever be the same. When the husks have been pressed, they arrive at a kind of combing machine 25 (Fig. 1a) having for its purpose to separate and stretch the pressed fibers and to purify them by means of combs and brushes.

The removal of the loosened particles of pith from the fibrous mass may be promoted by applying a jet of lye, preferably under pressure. In treating the fibrous material, it may be led also one or more times through hot soap-water, which can be recovered by pressing out the material.

As the husks still contain some lye, especially if a jet of lye is applied, these machines are constructed of a material, that will resist its action.

The treatment on the machines 25 results in the production of two different masses, viz: one with a surplus of fiber and a relatively small quantity of pith and another with much pith and relatively few fibers.

Under the combing machines 25 a shaking sieve is arranged separating provisionally the greater part of the pith particles from the fibers. The masses leaving the machine 25 are diverted in two directions, the mass containing the greater amount of fiber is conducted through the washing tank w to the pressing rollers 28 whilst the other mass containing a greater proportion of pith is passed through the combing machine 26 and the fibers resulting therefrom are carried back into the path of the fibers on their way to the pressing rollers 28, whilst the pith containing but a small quantity of fiber is passed through another washing tank w by the transporting devices shown and from thence to pressing rollers 27 to extract the lye, the pith then being carried on through another washing tank w (as indicated by the arrows) to another press 31 which again extracts any waste lye, the fiber then continuing its movement (as shown by the arrows) by the bands as shown to another tank w from whence it is removed and submitted to a press 32', the waste lye again being recovered. The pith is removed from the press 32' in the direction of the arrows shown and finally passed to the furnaces for heating the gas generators 17.

The fibers after leaving the pressing rollers 28 where the excess lye is removed, is passed on as shown by the arrows to a combing machine 29, from which the fibers are carried away in the direction of the arrows through a washing tank w and into a press 32. The pith extracted by the combing machine 29 is carried away and passed through another combing machine 30, the fiber being separated and passed into the press 32, but the pith from the machine 30 is conducted on its way to the main press 31. The fibers when treated in the press 32, the lye being extracted as before passes on to another combing machine 33 where any remaining pith is passed away to a combing machine 34, the fiber, however, from the combing machine 33 passing away by the arrows shown through a tank w to a press 51. Any fiber resulting from the action of the combing machine 34 also passes to the press 51, as before, by the arrows indicated. The pith from the combing machine 34 is passed through the press 32' and subsequently supplied to be burnt in the gas generators as before.

The fibers in the press 51 have any excess lye removed and are passed on to a combing machine 51' and any pith resulting from such combing action is carried away to a further combing press 51''. The fiber coming from the combing machine 51' also from the machine 51'' is carried away in the direction of the arrows through a washing tank w into a press 53. Any pith resulting from the action of the combing machine 51'' is passed through the press 56 to remove the surplus lye and is finally passed away to be burnt as before.

The fibers after leaving the press 53 are combed at 54 and 55 the fiber from which passes to a drying apparatus 57 whilst any pith is again separated and taken away for use in the furnaces.

The purpose of this drying in the drier 57 is to secure the drying of the fibers but at the same time leaving the adhering pith in a moist condition. As the fibers when dry tend to become stronger, it is easy to so treat them as by combing or the like to remove the pith.

After being differentially dried in the drying apparatus 57, the fiber is passed to a carding device 58 by which the long and the short fibers are separated, the short lengths being taken away to a cleaning device for cleaning, the refuse fiber which is then passed into a bale press 60 from whence the bales are packed at 61 for being taken away by transport. The refuse coming from 59 is carried away to be burnt. The relatively long fibers from the carding machine 58 are then carried on to drawing frames 62 and 63 after which they are led either to a gill spinning frame after which it may be packed and taken away or the fibers are dried at 66, after which the fibers are led to preparing machines such as roll and cop winders 67 after which the yarn is in a condition to be led into the loom 68 where it is woven into fabric. The manufactured fabric may be packed at 69 for transport.

The lye extracted at the various machines is led back by the pipe lines, as shown, to a series of tanks 35, 36, 37 and 38 where it is pumped by pumps 39 to an evaporator tank 72.

It is further observed, that owing to the irregularity in the diameter of the fibers, the spinning of yarn therefrom is very difficult.

The coconut fibers have, however, the property that they can be flattened in a somewhat moist state, that is to say that the cylindrical fibers may be transformed into a flat ribbon. This may e. g. be attained with a common spinning machine, by increasing the pressure between or on the feed rollers, or still better, by providing a special pair of rollers, designed for this purpose (indicated in Fig. 8), the pressure of which may be adjusted by means of spiral springs or the like. By flattening the fibers, several important advantages are attained. Experiments with spun yarn of different fibers will show the great increase of strength of the fiber, by twisting it. For example a jute yarn of very great tensile strength may be easily broken, when turning it back against the twist of the spinning. The strength of the yarn is thus increased by the greater adhesion of the fibers after twisting. By flattening the cylindrical shape of the coirfibers and especially the thick ones, tapes of uneven width are twisted instead of cylindrical fibers of uneven diameter and a very simple experiment will show that the adhesion between these tape fibers is very much greater than that of the cylindrical ones. However, the flattening of the fibers has yet another and also very important result: the resistance of a cylindrical bar against bending, being ever so much greater than that of a flat one; thus by flattening the fibers, they become much more resilient. From the rollers the flattened fibers pass directly to the spinning spindles and it will be possible to spin therefrom a fairly thin and equal yarn.

The yarns made from the combed, carded, stretched, flattened and spun fibers, may now be used for various purposes.

The still wet yarn is dried in the drying apparatus 66, also heated by means of generator gas and then goes to the looms 67.

In order to correctly understand Fig. 1 a–e it should be observed, that the flow of the various liquids, as well as the direction, in which the conveying belts are moving, are indicated by arrows. The pith is indicated by a circle with two slanting lines and the fibers by a circle with one slanting line; the water pipes by thick lines; from the main tank 70 and pump 71 the lye ducts by a thinner line and the gas ducts by a double line.

The main advantage of the process as per this invention, compared with the known methods of winning coirfiber for spinning purposes, is, that hitherto the winning of the coir-fiber for making yarn takes at least 5 months, whereas, according to the invention it can be done in about 2 hours.

The coirfiber won under the previous condition is not suitable for being spun completely by mechanical means and only handfed machinery exists, whereas the coir-fiber treated according to the invention, can be treated entirely mechanically, just the same as hemp, flax and other fibers.

Having thus described my invention what I claim as new and desire to secure by Letters Patent is:—

1. A process for obtaining spinnable fiber from coconut husks preferably containing ripe fruit flesh, consisting in separating the husk from the shell, crushing the husk to facilitate the access of liquid into the matted mass of fiber, saturating the husk with a liquid lubricant medium preferably a boiling weak alkali or other lye adapted to allow the fibers to slip easily over one another, pressing the saturated husk to remove the surplus lye, subjecting the husk to one or more operations whereby the saturated husk is disintegrated and alternately pressed between rollers, and differentially drying the fiber and pith to enable the complete removal of the latter, leaving the fiber separated and clean and in a condition suitable for spinning.

2. In a process as claimed in claim 1, removing the loosened particles of pith from the fibrous mass by a jet of lye preferably under pressure.

3. In a process as claimed in claim 1, soaking the fibers and pith (the latter still containing many fibers) after being separated from one another, in hot water.

4. In a process as claimed in claim 1, subjecting the saturated fibers and pith to a repeated pressing, combing, brushing and soaking treatment until the lye is diluted to the desired degree and the pith is removed as much as possible.

5. In a process as claimed in claim 1, spreading out the fibers, after being treated with lye and pressed, in a thin layer and then subjecting them to a short and rapid drying.

6. In a process as claimed in claim 1, subjecting the fiber bundles after being saturated with lye and pressed, to a rolling operation so that they are flattened into the form of tapes.

7. In the manufacture of spinnable yarn as claimed in claim 1, the combination of a tank containing hot lye, an endless chain moving therein, husk receiving compartments on the chain, of normal equal capacity where the husks are moving through and above the lye, and compartments of larger capacity where the husks pass into and leave the lye.

8. In the manufacture or spinnable yarn as claimed in claim 1, the combination of a tank containing hot lye, an endless chain moving therein, and compartments on the chain for receiving the husks with the upper stretch of the chain above, and the lower stretch of the chain beneath, the level of the lye, to allow the husks to drain off after being raised above the level of the lye.

9. In the manufacture of spinnable yarn as claimed in claim 1, the combination of a lye containing tank having parallel top and bottom walls, and semi-cylindrical end walls, a drum arranged within each semi-cylindrical end, an endless chain passing round the drums and perforated partitions on the chain to form a plurality of compartments.

10. In the manufacture of spinnable yarn as claimed in claim 1, the combination of a lye containing tank having parallel top and bottom walls and semi-cylindrical end walls, a drum arranged within each semi-cylindrical end, an endless chain passing around the drums, gauze-like partition members on the chain to form compartments, and means whereby when each partition reaches the end of an upper or a lower stretch they are moved through half of a circle and at the same time they are so adjusted that the corresponding compartments are first expanded beyond, and then contracted down to, normal size, for the purpose described.

11. In the manufacture of spinnable yarn as claimed in claim 1, the combination of a lye containing tank having parallel top and bottom and side walls and semi-cylindrical ends, external chambers provided on the parallel side walls, communicating openings between the tank and the said chambers, to allow the lye in the tank to circulate through the chambers, and means for heating said chambers and the lye therein.

12. In a process for obtaining spinnable fiber from coconuts as claimed in claim 1, subjecting the nut after removal of the husk to a cracking operation to break the shell, removing the milk, drying the shell and the kernel, then separating them, passing the shell to a furnace and carrying away the separated kernel, now in the form of copra, or storage and transport, whereby from one and the same nut there are obtained fiber capable of being spun and copra.

13. In a process for obtaining spinnable fiber from coconuts as claimed in claim 1, steeping the husks in a lye that may be used for a number of treatments without requiring to be intermediately regenerated.

14. A process as claimed in claim 1, in which the lye with which the fiber are saturated obtains its lubricating character by the lixiviation of the husks.

15. In a process as claimed in claim 1, subjecting the diluted lye which is pressed out of the husks to an evaporating action to re-concentrate it to the desired degree.

In testimony whereof I have signed my name to this specification.

BAREND GYSBERTUS HENDRIKUS van der JAGT.